United States Patent [19]

Shimura et al.

[11] Patent Number: 4,891,913
[45] Date of Patent: Jan. 9, 1990

[54] WEATHER STRIP STRUCTURE FOR USE WITH SUN ROOF

[75] Inventors: Ryoji Shimura; Jun Takahashi, both of Yokohama, Japan

[73] Assignee: Ohi Seisakusho Co., Ltd., Yokohama, Japan

[21] Appl. No.: 218,862

[22] Filed: Jul. 14, 1988

[30] Foreign Application Priority Data

Jul. 17, 1987 [JP] Japan .............................. 62-109116[U]

[51] Int. Cl.⁴ ................................................ E06B 7/16
[52] U.S. Cl. .......................................... 49/493; 49/488
[58] Field of Search ................. 49/497, 493, 488, 498, 49/485, 490, 491, 501; 296/216, 218, 93

[56] References Cited

U.S. PATENT DOCUMENTS

| | | | |
|---|---|---|---|
| 4,119,325 | 10/1978 | Oakley et al. | 49/493 X |
| 4,478,003 | 10/1984 | Flett | 49/485 |
| 4,626,026 | 12/1986 | Hasegawa . | |
| 4,666,206 | 5/1987 | Hough | 49/493 X |
| 4,738,482 | 4/1988 | Bohm et al. | 49/501 X |
| 4,757,643 | 7/1988 | Boots | 49/488 |
| 4,765,677 | 8/1988 | Nagata | 49/488 X |

FOREIGN PATENT DOCUMENTS

| | | |
|---|---|---|
| 62-77219 | 4/1987 | Japan . |
| 1011168 | 11/1965 | United Kingdom . |
| 2136038 | 9/1984 | United Kingdom . |
| 2171442 | 8/1986 | United Kingdom . |

Primary Examiner—Philip C. Kannan
Attorney, Agent, or Firm—Foley & Lardner, Schwartz, Jeffery, Schwaab, Mack, Blumenthal & Evans

[57] ABSTRACT

There is disclosed an improved weather strip structure for use with a sun roof construction which includes a sun roof opening bounded by a peripheral edge of a roof panel, a lid movable relative to the roof panel and slidable into its closed position wherein the peripheral edge portion of the lid is in contact with the peripheral edge of the roof panel. The weather strip structure comprises a holding structure including one part which is secured to the peripheral portion of the lid and the other part which has first and second supporting edges which are directed toward each other; and a weather strip including a solid base portion and an outwardly protruded lip portion, the solid base portion being formed at its lower and upper sides with first and second slits, wherein the holding structure holds the weather strip having the first and second supporting edges respectively mated with the first and second slits of the base portion of the weather strip.

6 Claims, 2 Drawing Sheets

WEATHER STRIP STRUCTURE FOR USE WITH SUN ROOF

BACKGROUND OF THE INVENTION

1. Field of the Invention

The present invention relates in general to weather strip structures installed in a motor vehicle, and more particularly to weather strip structures of a type which is incorporated with a sun roof construction for achieving a watertight seal of the sun roof lid relative to a peripheral edge of the sun roof opening formed in the roof panel of a motor vehicle.

2. Description of the Prior Art

In order to clarify the task of the present invention, one conventional weather strip structure of the above-mentioned type will be described with reference to FIGS. 5 and 6 of the accompanying drawings, which is disclosed in Japanese Patent First Provisional Publication No. 62-77219. As is seen from the drawings, a roof panel of a motor vehicle is formed with a generally rectangular sun roof opening 101 which is bounded by a peripheral edge 109 of the roof panel.

In the weather strip structure disclosed in the Publication, a holder 105 extends along the peripheral edge of a sun roof lid 103. The holder 105 is formed with a flange portion 107 to which a weather strip 111 is fixed at its base portion 113. A metal core member 115 is embedded in the base portion of the weather strip 111 for faslitating the fixing of the weather strip 111 to the flange portion 107 of the holder 105.

As is seen from FIG. 6, upon the sun roof lid 103 assuming its closed position, an outwardly protruded lip portion 114 of the weather strip 111 abuts on the peripheral edge 109 of the roof panel thereby to achieve a watertight sealing therebetween. Although not shown, a known tilt-up mechanism is incorporated with the sun roof lid 103 so that the lid 103 assuming its closed position as shown in FIG. 6 can tilt up and down about its front end providing a considerable clearance between the rear end of the lid 103 and the roof panel.

However, due to its inherent construction, the above-mentioned weather strip structure has the following drawbacks.

That is, during the tilt-up and tilt-down movements of the sun roof lid 103, the weather strip 111 is applied with a considerable stress due to a friction produced between the weather strip 111 and the peripheral edge 109 of the roof panel. Thus, after long use, it tends to occur that the weather strip 111 is displaced and in a much severe case, disconnected from the flange portion 107 of the holder 105.

SUMMARY OF THE INVENTION

It is therefore an object of the present invention to provide a weather strip structure for a sun roof construction, which is free of the above-mentioned drawbacks.

According to the present invention, there is provided an improved weather strip structure for use with a sun roof construction which includes a sun roof opening bounded by a peripheral edge of a roof panel, a lid movable relative to the roof panel and slidable into its closed position wherein the lid is received in the sun roof opening having a peripheral edge portion thereof mated with the peripheral edge of the roof panel. The weather strip structure comprises a holding structure including one part which is secured to the peripheral edge portion of the lid and the other part which has first and second engaging portions which are directed toward each other; and a weather strip including a solid base portion and an outwardly protruded lip portion, said solid portion having at its upper and lower portions first and second engaged portions, wherein the holding structure holds the weather strip having the first and second engaging portions latchingly mated with the first and second engaged portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
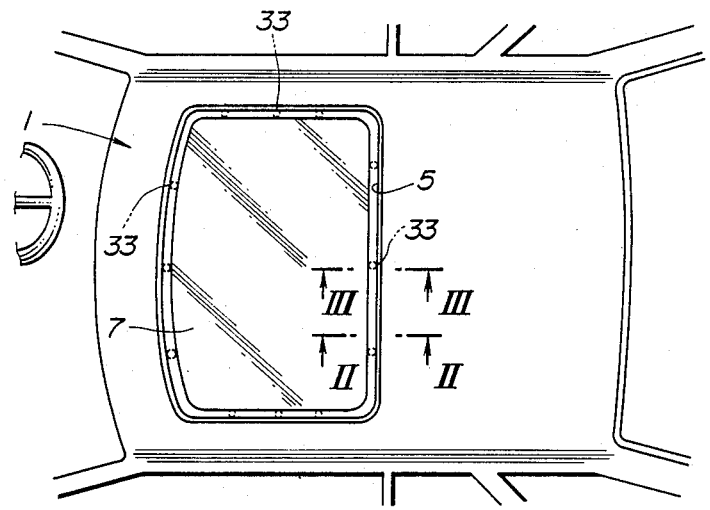
FIG. 1 is a plan view of a motor vehicle equipped with a sun roof construction to which a weather strip structure of the present invention is practically applied.

Referring to FIGS. 1 to 4 of the accompanying drawings, there is shown a weather strip structure according to the present invention, which is incorporated with a sun roof construction of a motor vehicle.

In the drawings, denoted by numeral 1 is a roof panel of the vehicle. As is seen from FIGS. 2 and 3, the roof panel 1 comprises outer and inner panels 3a and 3b which are combined in a known manner.

Figure 2:
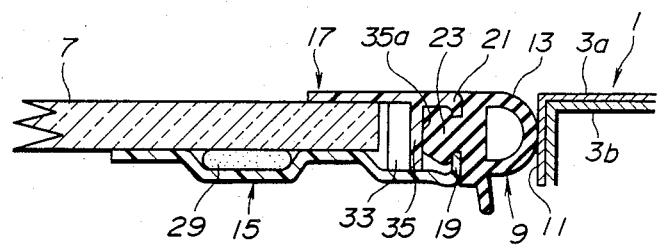
FIG. 2 is an enlarged sectional view taken along the line II—II of FIG. 1.
Figure 3:
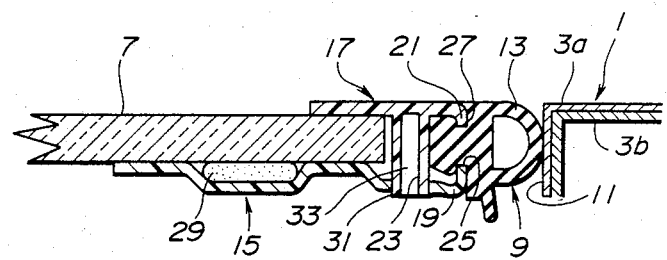
FIG. 3 is an enlarged sectional view taken along the line III—III of FIG. 1.
Figure 4:
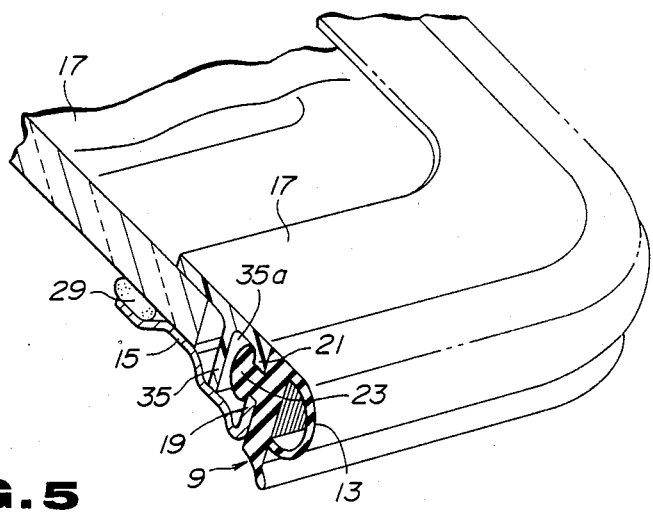
FIG. 4 is a partially sectioned perspective view of the weather strip structure of the present invention.
Figure 5:
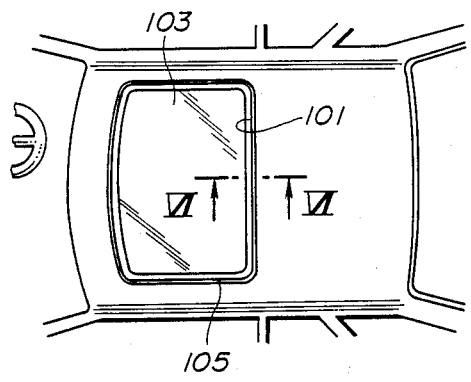
FIG. 5 is a plan view of a motor vehicle equipped with a sun roof construction to which a conventional weather strip structure is applied.
Figure 6:
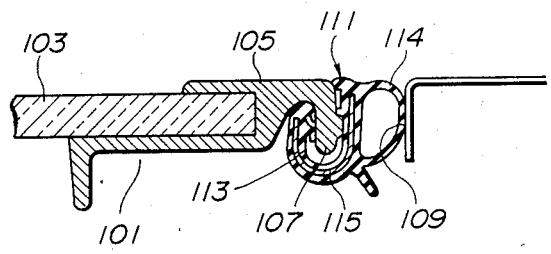
FIG. 6 is an enlarged sectional view taken along the line VI—VI of FIG. 5.

The sun roof construction comprises a generally rectangular sun roof opening 5 formed in the roof panel 1 and a sun roof lid 7 constructed of a transparent material. The sun roof opening 5 is thus bounded by a peripheral edge 11 of the roof panel 1. The sun roof lid 7 is arranged to slide axially beneath the roof panel 1 and closes the sun roof opening 5 when assuming its foremost position. That is, during the forward movement of the lid 7, the front end of the lid is gradually raised and finally contacts the forward edge of the opening 5. While, during the forward movement of the lid 7, the rear end of the same runs beneath the roof panel 1, and when the lid 7 comes to the frontmost position, the rear end of the same is raised up to become flush with the roof panel 1 as shown in FIGS. 2 and 3. Under this condition, a watertight seal is achieved between the lid 7 and the peripheral edge 11 of the sun roof opening 5 by means of an after-mentioned weather strip structure of the invention. Although not shown in the drawings, a known tilt-up mechanism is incorporated with the lid 7, so that the lid 7 in the fully closed position can be tilted up about its front end providing a considerable clearance between the rear end of the lid and the roof panel 1.

As is well seen from FIGS. 2 and 3, the weather strip structure comprises a first holding member 15 constructed of a molded rigid plastic. The first holding member 15 is shaped like a rectangular frame and is bonded through an adhesive 29 to a lower peripheral surface of the lid 7 fringing the same. The first holding member 15 is formed therethrough with a radially outwardly extending flange part whose outward end is bent upward to form a first supporting edge 19. For the purpose which will become clarified hereinafter, the flange part of the first holding member 15 is formed with a plurality of openings 31 which are plotted along the periphery of the lid 7. Preferably, at least three openings 31 are formed in each side of the rectangular first holding member 15.

A second holding member 17 of molded plastic is shaped also like a rectangular frame, which is placed on an upper peripheral surface of the lid 7 and is fixed to the first holding member 15 in a manner as will be described hereinafter. The second holding member 17 is formed therethroughout with a radially outwardly extending flange part whose outward ends is bent downward to form a second supporting edge 21. The flange part of the second holding member 17 is formed with a plurality of downwardly extending tubular projections 33 whose leading ends are mated with the openings 31 of the first holding member 15 to achieve a tight connection between the first and second holding members 15 and 17. Upon this, the first and second supporting edges 19 and 21 are directed toward each other. As is seen from FIGS. 2 and 4, the flange part of the second holding member 17 is further formed with a suitable number of partition walls 35 each extending between adjacent two of the tubular projections 33. The outboard surface of each partition wall 35 is denoted by numeral 35a.

A weather strip 9 in the shape of a rectangular frame is held by the first and second holding members 15 and 17. As is seen from FIG. 2, the weather strip 9 comprises a solid base portion 23 and an outwardly protruded lip portion 13. The base portion 23 is formed at its lower and upper sides with first and second slits 25 and 27 which extend along the entire length of the weather strip 9. As shown, the first and second holding members 15 and 17 hold the weather strip 9 having the first and second supporting edges 19 and 21 thereof tightly engaged with the first and second slits 25 and 27 respectively. Thus, upon assembly, the inboard part of the solid base portion 23 of the weather strip 9 is pressed against the partition walls 35 of the second holding member 17. Due to a counterforce thus produced by the flexible base portion 23, the fixing of the weather strip 9 to the first and second holding members 15 and 17 is assured. That is, any play of the base portion 23 relative to the holding members 15 and 17 is suppressed.

As is described hereinabove, since the weather strip 9 is tightly connected to the lid 7, the undesired disconnection of the weather strip 9 from the lid 7 does not occur even when the weather strip 9 is applied with a considerable stress by the peripheral edge 11 of the roof panel 1 during the tilt-up and tilt down movement of the lid 7.

What is claimed is:

1. In a sun roof construction including a sun roof opening bounded by a peripheral edge of a roof panel, and a lid movable relative to said roof panel and slidable into its closed position wherein said lid is received in said sun roof opening having a peripheral edge portion thereof mated with said peripheral edge of said roof panel.
   a weather strip structure comprising:
   a holding structure including one part which is secured to the peripheral edge portion of the lid and the other part which has first and second engaging portions which are directed toward each other, said first and second engaging portions constituting first and second supporting edges respectively; and
   a weather strip including a solid base portion and an outwardly protruded lip portion, said solid portion having at its upper and lower portions first and second engaged portions, said first and second engaged portions constituting first and second slits respectively such that said first and second supporting edges are tightly received in said first and second slits respectively,
   wherein said holding structure holds said weather strip having said first and second engaging portions latchingly mated with said first and second engaged portions,
   said holding structure comprising:
   a first supporting member bonded to a lower peripheral surface of said lid, said first supporting member having a part by which said first supporting edge is defined;
   a second supporting member placed on an upper peripheral surface of said lid, said second supporting member having a part by which said second supporting edge is defined; and
   means for integrally connecting said first and second supporting members.

2. A weather strip structure as claimed in claim 1, in which said means comprises a plurality of openings formed in said first supporting member, and a plurality of projections extending from said second supporting member, said projections being snugly mated with said openings to achieve a tight connection between said first and second supporting members.

3. A weather strip structure as claimed in claim 2, in which said second supporting member is formed with a plurality of partition walls each extending between adjacent two of the projections of the second supporting member.

4. A weather strip structure as claimed in claim 3, in which, upon assembly, said solid base portion of said weather strip is pressed against the partition walls of said second supporting member thereby to suppress a play of said weather strip relative to the combined first and second supporting members.

5. A weather strip structure as claimed in claim 4, in which the projections of the second supporting member are tubular projections.

6. A weather strip structure as claimed in claim 5, in which said first and second supporting members are each constructed of a thermoplasic resin.

* * * * *